United States Patent [19]

Rowlands

[11] Patent Number: 5,006,303
[45] Date of Patent: Apr. 9, 1991

[54] NUCLEAR POWER PLANT

[76] Inventor: Ivor T. Rowlands, Eversley House, Kingsley Road, Frodsham, Cheshire, England, WA6 6EY

[21] Appl. No.: 441,171

[22] Filed: Nov. 27, 1989

Related U.S. Application Data

[63] Continuation-in-part of Ser. No. 695,262, Jan. 28, 1985, abandoned.

[30] Foreign Application Priority Data

Jun. 9, 1981 [GB] United Kingdom ................ 8117616

[51] Int. Cl.$^5$ ............................................. G21C 15/18
[52] U.S. Cl. .................................... 376/282; 376/281; 376/287; 376/298; 376/299; 376/307; 376/905
[58] Field of Search ............... 376/282, 283, 287, 307, 376/298, 299, 380, 905, 281

[56] References Cited

U.S. PATENT DOCUMENTS

| | | |
|---|---|---|
| 3,121,046 | 2/1964 | Trickett et al. |
| 3,190,808 | 6/1965 | Dodd |
| 3,203,867 | 8/1965 | Williams et al. |
| 3,376,357 | 4/1968 | Black |
| 3,528,884 | 9/1970 | Collier et al. |
| 3,793,143 | 2/1974 | Muller ................................. 376/298 |
| 3,929,567 | 12/1975 | Schabert et al. |
| 3,981,770 | 9/1976 | Middleton |
| 4,312,703 | 1/1982 | Woudstra ............................. 376/299 |
| 4,367,194 | 1/1983 | Schenewerk et al. ............... 376/282 |
| 4,382,907 | 5/1983 | Robin ................................... 376/299 |

FOREIGN PATENT DOCUMENTS

| | | |
|---|---|---|
| 2640786 | 3/1978 | Fed. Rep. of Germany ...... 376/299 |
| 964841 | 7/1964 | United Kingdom ................. 376/298 |
| 1026474 | 4/1966 | United Kingdom ................. 376/299 |

OTHER PUBLICATIONS

Nuclear Engineering, vol. 22, No. 257, (5/77), pp. 41–45, Banal.
J. Br. Nucl. Energy Soc., vol. 14, No. 2, (4/75), p. 111.
Physics Today, Aug. 1973, pp. 30–35.
Nuclear Power, Nov. 1957, pp. 473–477, "The Organic Liquid Moderated Reactor", Bowker.

Primary Examiner—Harvey E. Behrend
Attorney, Agent, or Firm—Carothers & Carothers

[57] ABSTRACT

An improved emergency cooling system is provided for an organic cooled and moderated nuclear reactor. The cooling system permits an inherently safe reactor design to be achieved having a number of other novel and significant advantages. Most importantly, the reactor can be designed to survive a largest credible accident which involves the loss of the entire primary coolant inventory, while continuing to provide core cooling in a passive mode for a period of one or more days post-accident. The invention utilizes a combination of integers and parameters never previously contemplated in combination, namely a large store of emergency coolant, several times the volume of the primary coolant inventory, stored in accumulators at an overpressure above the saturated vapor pressure of the primary coolant and moderator at the reactor normal operating temperature, coupled with the use of an emergency coolant having a higher boiling point than that of the primary coolant and moderator, coupled with the use of a two-stage core coolant-to-intermediate coolant-to-atmospheric air heat rejection circuit for the core post-accident, of which each of the two stages is a natural convection circuit.

16 Claims, 6 Drawing Sheets

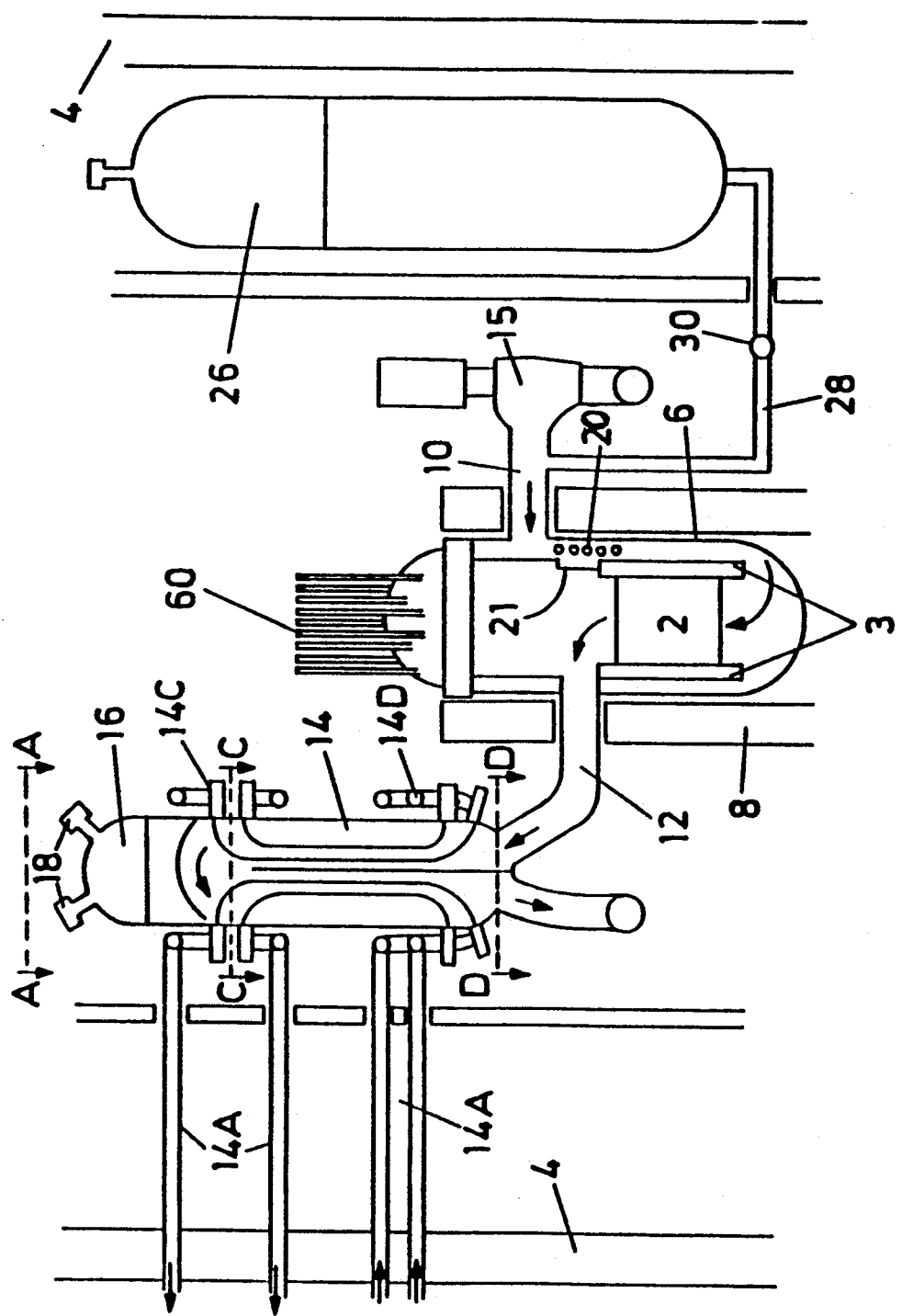

NUCLEAR POWER PLANT

This is a continuation-in-part of copending application(s) Ser. No. 06/695,262 filed on Jan. 28, 1985, now abandoned.

TECHNICAL FIELD

The invention relates to nuclear reactors of the kind known as organic liquid moderated and cooled reactors. The present invention provides such a reactor of improved safety characteristics.

BACKGROUND ART

The use of an organic coolant and neutron moderator in a thermal nuclear reactor has already been proposed, and in particular the United States Organic Moderator Reactor Experiment (OMRE) was designed to use organic liquid for both coolant and moderator purposes but in separate circuits. The reactor utilised a separate core vessel containing relatively low temperature organic liquid moderator, with a relatively slow circulation rate. The organic coolant was passed over the fuel in the fuel channel tubes at a substantially higher temperature. However after only a short period of operation the concept was abandoned due to the high degradation rates of the organic oolant in the moderator circuit and on occasion in the coolant circuit.

A development of this experimental reactor was a power demonstration reactor at Piqua, Ohio. This reactor utilised a single pass of coolant, but the moderator region and fuel regions were separated with different flow velocities. This feature gave rise to unacceptable degradation of the coolant and the reactor was shut down after the initial period of operation. Piqua is the only example of an organic liquid moderated and cooled power reactor to proceed to construction and operation even though its limited operation (1964 to 1966) was unsuccessful and did not establish the feasibility of organic coolant.

With the advantage of that experience and as part of the Canadian deuterium-uranium (CANDU) programme, organic liquid coolant had been recognised as potentially advantageous and the Canadian Organic Cooled Reactor (CANDU-OCR) was developed, which used organic liquid as coolant only, the moderator being heavy water. A prototype reactor, the Whiteshell WR-1, has been built and its successful operation has demonstrated the technology and use of organic coolant. Commerical designs have been proposed but have not been implemented.

A major consideration in all nuclear reactor design, whatever the nature of the coolant and the moderator, is safety. Designers are constantly striving towards a so-called 'inherently safe' reactor, by which is meant one whose safeguard systems are of such a design that upon the occurrence of fault conditions up to and including the most severe design postulated fault (sometimes termed the largest credible accident) they maintain the reactor in a safe condition for an extended period without any corrective action by the operators, before further safeguard actions are required. The length of that extended period is not defined, but it should preferably be a minimum of several hours and preferably up to a week. It is of course up to the designer to identify and specify the most severe design postulated fault to which any particular reactor has been designed. To date there are no known proposals for an inherently safe reactor that will withstand a loss of the whole of the normal operating inventory of both coolant and moderator.

THE INVENTION

The invention is a development of the organic liquid and cooled reactor from that at Piqua which takes note of the technology requirements for organic coolants established by the operation of the Whiteshell WR-1 reactor. Such reactors, being organic cooled (and in the case of the Piqua reactor also being organic moderated) offer unique opportunities to create an improved emergency cooling system which takes advantage of the possible choice, and thus control of the boiling point of the coolant. This choice and control is simply not available for liquid sodium cooled or pressurized water reactors (PWRs) since the physical properties of the coolant are invariable.

A main object of the invention is the design of an organic cooled and moderated reactor which, by virtue of its organic coolant/moderator, operates normally at a pressure substantially lower than a PWR, but which in the case of a postulated breach of the primary cooling circuit invokes an emergency cooling system which operates at substantially lower pressures without loss of emergency coolant due to boiling. The design criteria envisaged for a reactor provided with an improved emergency cooling system according to the invention are that the primary cooling circuit of the reactor should be capable of operating at a normal operating pressure of up to 550 p.s.i.g. (compared with a typical operating pressure of 2200 p.s.i.g. for the primary cooling circuit of a PWR) but after the postulated breach of the primary cooling circuit, the emergency cooling should continue at atmospheric pressure or near atmospheric pressure. This can be achieved according to the invention without boiling off of the emergency coolant, and without the need for any emergency power sources to maintain the emergency cooling. The emergency cooling system can be made entirely responsive to the pressure in the primary cooling circuit, so that it functions automatically on a fall in the pressure in the primary cooling circuit. This automatic response can be achieved by the action of non-return valves which are opened by the consequences of the fault or by the de-energizing of valves held in the closed position by electrically or phneumatically powered actuators. Hence no motive power is required, at least for an extended period of time post-accident.

The emergency cooling system of the invention incorporates two aspects of cooling the core: automatic flooding of the core with an organic emergency coolant in the case of a postulated breach of the primary cooling circuit, and a two-stage natural convection heat rejection from the flooded core.

The core flooding is from accumulator means containing organic emergency coolant at a pressure above the saturated vapour pressure of the primary organic coolant at the operating temperature of the reactor. The organic emergency coolant must (a) be mutually compatible with the operating primary organic coolant and must (b) have a higher boiling point than that of the operating primary organic coolant at atmospheric pressure. These are criteria that can, as a practical matter, be satisfied only with organic cooled and moderated reactors. No higher boiling but compatible emergency coolant would be available, for example, in PWR technology.

The post-cooling of the invention is sufficient to prevent the organic emergency coolant liquid from boiling, and in a purely passive system can continue to cool the core for up to several days. A first natural convection circuit is opened in response to the pressure drop in the primary cooling circuit, for example by release of a power-closed valve. The natural convection flow through the first natural convection circuit is sustained by heat rejection to a first heat exchanger which has the organic emergency coolant in the primary cooling vessel on its primary side and an intermediate organic coolant on its secondary side.

The intermediate organic coolant circulates in a second natural convection circuit in which the natural convection flow is sustained by heat rejection to a high level second heat exchanger which has the intermediate organic coolant on its primary side and atmospheric air (externally of the containment building) on its secondary side. The second natural convection circuit may be permanently open-circuit even during normal operation of the reactor, or may be established only on release of a power-closed valve in the same way as the first natural convection circuit.

The above dual aspect of the emergency cooling system of the invention ensures rapid and automatic response to a most severe postulated design fault which comprises a breach in the primary cooling circuit sufficient to cause loss of the entire primary inventory of coolant and moderator. The invention permits the economically feasible design of a so-called 'inherently safe' reactor capable of meeting that taxing design criterion. In the case of the above postulated fault condition, there would be a rapid reduction in the operating pressure of the primary cooling vessel as the primary cooling circuit was breached, and in a worst case the primary organic coolant and moderator would have discharged through the breach, possibly in a matter of seconds. That working organic coolant would be replaced, equally rapidly, by organic emergency coolant from the accumulator means which would be charged into the primary vessel under the pressure head pre-established in the accumulator means. Although the primary organic coolant and moderator would have boiled and 'flashed off' on initial loss of pressure, the organic emergency coolant has a higher boiling point and could be contained in the primary vessel without boiling, by virtue of its higher boiling point and by virtue of the two-stage natural convection heat rejection from the primary vessel. This two-stage natural convection heat rejection is feasible primarily because the use of an organic emergency coolant of sufficiently high boiling point enables the core temperature post-accident to be maintained at 300° C. or above preferably at a pressure close to atmospheric without boiling of the emergency coolant. This makes it possible to establish and maintain temperature gradients in the two natural convection heat rejection circuits which ensure a natural convection flow in each circuit sufficiently vigorous to maintain adequate cooling.

It has been calculated by the inventor that the above sequence of cooling, in the case of the most severe design fault, ought to be possible without causing the pressure in the containment building to rise more than a nominal amount above atmospheric. This is to be contrasted with current PWR technology which requires physical pumping of emergency cooling water through the core post-accident and which requires a very significant overpressure in the containment building to prevent the pumped emergency cooling water from boiling.

In a preferred embodiment, the invention utilizes the fact that the physical properties of an irradiated organic coolant are different from those before irradiation, although both before and after irradiation the coolant remains fully miscible and compatible. Irradiation in particular has the effect of reducing the temperature at which the organic coolant begins to boil. Therefore a preferred organic primary coolant and moderator is an organic liquid which was originally the same as that used as organic emergency coolant but which has had its physical properties modified by irradiation.

Preferably the initial coolant, before irradiation, is the same as the organic emergency coolant and is a mixture of hydogenated terphenyls of differing molecular weights and physical properties. Being a mixture, the coolant does not have unique physical properties. For example when it 'boils', the initial 'boiling point' is determined principally of the lightest molecular weight fraction which is driven off preferentially: therefore as the boiling continues, the 'boiling point' progressively increases. When the reactor is in operation the coolant is continuously degraded by the effect of both the operating temperature and the high energy neutron flux principally the latter. The degradation products include both heavier and lighter molecular weight products. In operation, therefore, the coolant must be processed to maintain the concentrations of the degradation products within acceptable limits. Methods of purifying the coolant to maintain an acceptable 'equilibrium' coolant composition have been demonstrated in the operation of Whiteshell WR-1.

Thus the preferred fresh or feed coolant used for the initial coolant charge and for subsequent make up, and as emergency organic coolant in the accumulator(s), is a proprietary mixture of hydrogerated terphenyls known by the Trade Mark HB-40 and being a mixture of approximately 80% by weight of partially hytdrogenated terphenyl isomers and approximately 20% of higher molecular weight components, mostly quaterphenyls. Its 'boiling point' is 330° C. at atmospheric pressure and its 'saturation vapour pressure' at 400° C., the nominal maximum working temperature of the reactor, is 40 psia. Due to the build-up of lighter fractions in the primary cooling circuit, however, the 'saturation vapour pressure' at 400° C. of the equilibrium working primary coolant and moderator is about 150 psia and its 'boiling point' is below 200° C.

By the addition of higher molecular weight terphenyls to the feed coolant, and/or the reduction of lighter fractions, emergency coolant mixtures of even higher atmospheric pressure 'boiling point' may be utilised if required.

All these coolants are chemically compatible and miscible for all mixtures of interest, and are liquid at temperatures relevant to the reactor operation and fault conditions.

In the literature, the organic cooled reactor has been compared to a PWR. See for example MW Bowker 'The Organic Liquid Moderated Reactor' (Nuclear Power, November 1957). Both reactors are liquid cooled and moderated and their reactor physics properties are similar since they are both hydrogen moderated and the hydrogen 'density' in water and the organic are of similar magnitude. However, there are fundamental differences between the two systems which include the following.

COOLANT

The physical properties of the two coolants are very different. Water is a chemically simple compound with unique physical properties. It is liquid at ambient temperatures, its boiling point is 100° C. at atmospheric pressure and its saturation vapour pressure is approximately 1700 psi at typical PWR operating temperatures. To maintain an adequate margin of sub-cooling a typical PWR operating pressure is 2300 psi. The properties of the organic coolant with respect to boiling have been described earlier and, as a consequence, a typical organic reactor operating pressure to maintain an adequate margin of 'sub-cooling' is 350 psia.

Further differences are that water is transparent and non-combustible while organic is generally opaque and combustible. These differences lead to different requirements for refuelling and for fire hazard. Organic coolant has inferior heat transfer properties to water and, unless specified minimum conditions of coolant composition and flow velocity are observed, it may build up deposits on fuel surfaces which will cause overheating and possibly flow blockages. Water is relatively corrosive to common structural materials whereas organic is virtually non-corrosive.

FUEL

Both organic reactors and PWR can utilise enriched uranium as oxide but the preferred fuel cladding for organic might be stainless steel whereas zirconium is now universally used for PWR. Organic reactors can utilise enriched uranium carbide fuel, preferably clad in zirconium, but uranium carbide is not practicable for PWR since it reacts with water.

PRIMARY AND SECONDARY COOLANT CIRCUITS

The pressure differences inherent in the use of organic liquid or water as coolants described above reflect into the design of the primary circuits. The high pressure, heavy section steel (i.e. thick walled) circuit components required for PWR require the use of techniques at the limit of current technology to achieve structures of acceptable integrity for the safety case: this places severe constraints on the design choice for the arrangement and dimensions of the PWR primary coolant circuit. The low pressures required by the organic coolant call for light section (i.e. thin walled) circuit components which are well within current technology with simpler substantiation of acceptable integrity for the safety case: this permits greater design freedom for the arrangement and dimensions of the organic primary coolant circuit.

The preferred secondary coolant for both reactor systems is water/steam. However the differences in coolant properties and primary circuit design requirements provide greater design freedom for organic steam generators than for PWR.

In the event of failure of the boundary between primary and secondary coolants, the direction of flow is reversed as between the organic reactor and the PWR.

If necessary for increased safety, the organic reactor can utilise organic coolant for the secondary coolant circuit also: this arrangement permits the containment (reactor building) to contain only low pressure components with correspondingly greater assurance of circuit structural integrity within the containment. In principle, organic secondary coolant can also be used for PWR but the same safety advantage cannot be gained because the primary circuit of PWR is already at high pressure.

These differences between the organic cooled reactor and the PWR are such that, in engineering terms, the design of the two systems is completely different with only a few components of the two systems bearing more than superficial resemblance to each other. Further, the behaviour of the reactors under fault conditions are different in major respects because of the major differences in the physical properties of the coolants, the mechanical loadings to which the reactor structures and the fuel are subjected and because of the differing provisions for safeguard plant arising from both the differing physical properties of the coolant and the engineering design constraints. Thus the organic reactor and PWR are comparable only in the most general and superficial sense.

The power plant of the invention comprises a nuclear reactor of an enriched uranium fuel that is cooled and moderated in a single pass by a flow of primary organic coolant, and an emergency cooling system comprising a reservoir of organic coolant for flooding the reactor core and heat exchange arrangements for maintaining cooling in a post-accident situation without utilising any prime mover or external power source.

The power plant of the invention takes advantage from the fact that the low system pressure provided by the organic coolant enables the emergency core cooling system to provide its cooling function in post-accident situations in a simple manner, depending on a minimum of simple components for its actuation. Only the tripping of control rods into the reactor and of power supplies to valves is required to maintain reactor safety for a period of at least 24 hours post-accident, and possibly much longer, for even the most serious postulated accidents such as a major break in the primary cooling circuit. For less serious accidents and indeed for most credible faults these actions are sufficient to maintain the reactor safe for a prolonged period of more than a week. For similar fault conditions on current operative water cooled reactors, pumped emergency cooling systems with independent power supplies are required to start up within a matter of seconds and to become fully effective within approximately one minute.

For example, the primary organic coolant in the power plant of the invention may be used at a pressure of no more than 400 p.s.i. (2,758,800 pascals) and in one embodiment no more than 50 p.s.i. (344,850 pascals) over its saturation vapour pressure at the chosen operating temperature.

Generally the primary coolant circuit design pressure may be in the range 50 p.s.i.g. (446,000 pascals) to 500 p.s.i.g. (3,893,000 pascals). The choice of a higher pressure system would provide maximum economic benefit and of a lower pressure system would provide maximum safety margins.

For primary circuit pressure in this range it is practicable and economic to provide, in the emergency cooling system, very large capacity emergency coolant accumulators designed for the same pressure as the primary circuit and pressurised by an inert gas volume to a pressure between the coolant saturation vapour pressure and the normal primary circuit operating pressure. These accumulators may therefore be isolated from the primary circuit each by only a single non-return valve, since back leakage from the primary coolant circuit to the accumulators does not hazard the primary circuit integrity.

As previously explained, the physical properties of the coolant are altered by the operation of the reactor. The accumulators, however, may contain either fresh unirradiated coolant with the physical properties of the raw coolant or a coolant specified for emergency coolant duty only, having a 'boiling point' at atmospheric pressure approximately equal to the maximum operating temperature of the reactor coolant.

Because the accumulators inject at pressures above the coolant saturation pressure, for all postulated breaches of the primary circuit the coolant is maintained sub-cooled and liquid through the post-fault period. In faults where most or all of the operational coolant inventory is lost and is replaced by the accumulator inventories, the emergency coolant from the accumulators will not boil even though temperatures near, or even above, the normal maximum operating temperatures are reached depending on the physical properties of the coolant in the accumulators.

Boiling is prevented by the action of the heat rejection circuit described below.

For intact circuit faults and for post transient breached circuit conditions, when primary coolant circulation through the steam generators is lost, the emergency cooling system further comprises an organic coolant to intermediate organic coolant to air two stage natural convection heat exchanger arrangement. The natural convection route through the primary cooling vessel is preferably brought into circuit by spring loaded nonreturn valves, incorporated in the reactor vessel upper support structure, which are normally held closed by the pressure head of the main coolant circulation pumps, or by power operated valves. Operation of these valves re-establishes core cooling by natural circulation, even in a breached circuit. The intermediate organic circuit in turn is a natural convection circuit which rejects its heat to the atmosphere via a further heat exchanger mounted at high elevation on the outside of the containment building. The coolant circulation in the intermediate organic circuit is also by natural convection and may be continuous even in fault free conditions or may be established when a valve which normally prevents circulation is opened by the reactor trip signal, the trip signal breaks the power supply which normally holds the valve closed against a spring. No power supplies are therefore necessary to maintain the core cooling circuit.

The uranium fuel may be enriched uranium oxide or carbide. The fuel may be clad in a number of materials, the preferred material for uranium oxide fuel being stainless steel and that for uranium carbide being zirconium, to form fuel pins. The use of uranium carbide is particularly advantageous, since it offers substantial operational and safety advantages over uranium oxide. For example, for a given fuel pin linear heat rating typical of power reactors, its high conductivity gives lower fuel temperatures and at these temperatures fission product gas release is negligible. Moreover, because of the lower fuel temperatures the stored energy in the fuel under major accident conditions is much reduced and the temperature excursion of the fuel is correspondingly decreased in a given transient. It is practicable to use uranium carbide in an organic cooled reactor, since the uranium carbide is compatible with the organic coolant. The use has been demonstrated in the Whiteshell WR-1 reactor. On the other hand uranium carbide is not compatible with water, and hence is not used in water cooled reactors.

The primary organic coolant flow rate through the core should be chosen at an optimum value to minimise the degradation rate of the coolant, to prevent deposition of carbonaceous degradation products on the fuel ('fouling') and to maintain the necessary heat transfer conditions on the fuel. This requires approximately twice the core mass flow as with a pressurised water cooled reactor and a somewhat higher flow velocity. These requirements determine the height to diameter ratio of the core.

In normal operating conditions the organic primary coolant can be maintained at temperatures up to approximately 400° C., at which temperature the thermally and irradiation induced chemical degradation is acceptably low, enabling the coolant quality to be maintained by the continuous processing of a small by-pass flow to the main coolant circuit in which the undesirable fractions are removed and fresh makeup coolant is added as required.

A further advantage of a nuclear power plant constructed according to the invention is the greater choice of practicable designs of the heat exchanger utilized in the transfer of useful heat to a secondary coolant for steam generation for steam turbines in normal operating conditions. This flexibility arises from three properties of the organic coolant: the low circuit design pressure described above, the fact that the organic coolant itself is not made significantly radioactive by irradiation in the core, and the very low corrosion rate of the circuit materials in the organic coolant. The latter property gives rise to very low levels of radioactive corrosion product transport in the circuit (in contrast to very high levels of deposited corrosion product activity in water circuits).

In the application where the secondary coolant is water as liquid and steam, the secondary circuit pressure is much higher than that of the primary circuit (typically 1,000 to 1,600 p.s.i.g. or 7,000,000 to 11,140,000 pascals, in the secondary circuit as compared with 300 to 550 p.s.i.g. or 2,170,000 to 3,893,000 pascals, in the primary circuit. In pressurised water cooled reactors the primary coolant is at the higher pressure (typically 1,700 to 2,300 p.s.i.g. or 11,825,000 to 15,965,000 pascals). In all cases some form of shell and tube heat exchanger is used but the above considerations constrain pressurised water cooled reactors to have the primary coolant on the tube side of the heat exchanger and the secondary water and steam on the shell side: this constraint makes steam superheat difficult to achieve (although it is achieved in some designs at the cost of increased circuit complexity). With the organic coolant the primary coolant is at low pressure and is inactive and there is therefore no constraint to its being on the shell side of the heat exchanger, the high pressure secondary coolant then being in the tubes. This arrangement readily permits steam to be superheated and allows the high primary coolant flow rate to be achieved with low pressure head losses making the primary coolant circulating power requirements practicable and economic.

The heat exchanger may thus raise high pressure steam which in turn drives a turbo-generator. The steam may be super-heated, either within the steam generator or by a separate super-heater. Condensate from the turbo-generator may be returned to the heat exchanger as feed water. Generally the secondary coolant pressure will exceed the primary organic coolant pressure, so that any leakage would be in the direction of secondary to the primary circuit. This is a valuable safety feature not found in pressurised water cooled reactors.

If desired, the secondary coolant in the heat exchanger may also be organic coolant which is in turn fed to a second heat exchanger where it is used to provide a supply of hot water or steam. This application has the advantage of increasing the isolation of the resulting hot water or steam from the nuclear reactor core and primary circuit.

The fact that the organic coolant itself is not significantly activated by the neutron flux and that only very small amounts of activated corrosion products are carried by its means that only a minimal quantity of radio active wastes, other than spent fuel, are produced in the operation of the station. This greatly reduces the plant required for the treatment and storage of active wastes to only a small fraction of that required for pressurised water reactors with consequent reductions of cost, operational requirements and personnel exposure. The total personnel radiation exposure incurred in the maintenance and operation of the station is anticipated to be an order of magnitude lower than even the lowest figure achieved or anticipated for pressurised water reactors.

The organic primary coolant may be of any organic liquid that has a cooling and neutron moderating effect, and that is chemically stable under the conditions to be found in the core. A suitable primary organic coolant is a hydrogenated or partially hydrogenated mixture of terphenyls.

DRAWINGS

FIG. 3 is a staggered vertical section taken along the line E—F of FIG. 2;

BEST MODE FOR CARRYING OUT INVENTION

Figure 1:
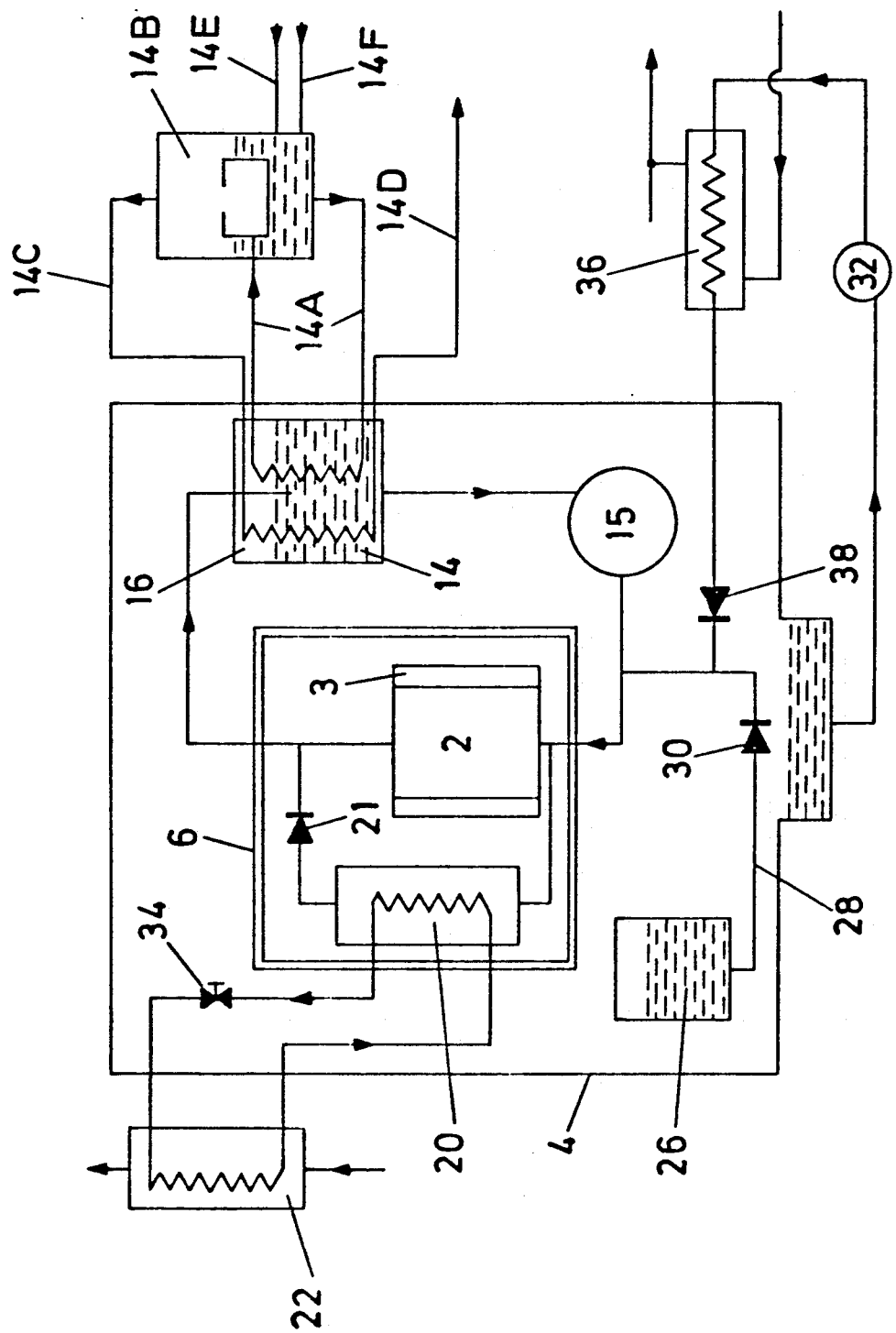
FIG. 1 is a flow diagram illustrating a power plant according to the invention.

Referring first to the embodiment of FIG. 1, a reactor core 2 and primary coolant circuit is contained within a containment building 4.

Figure 3A:
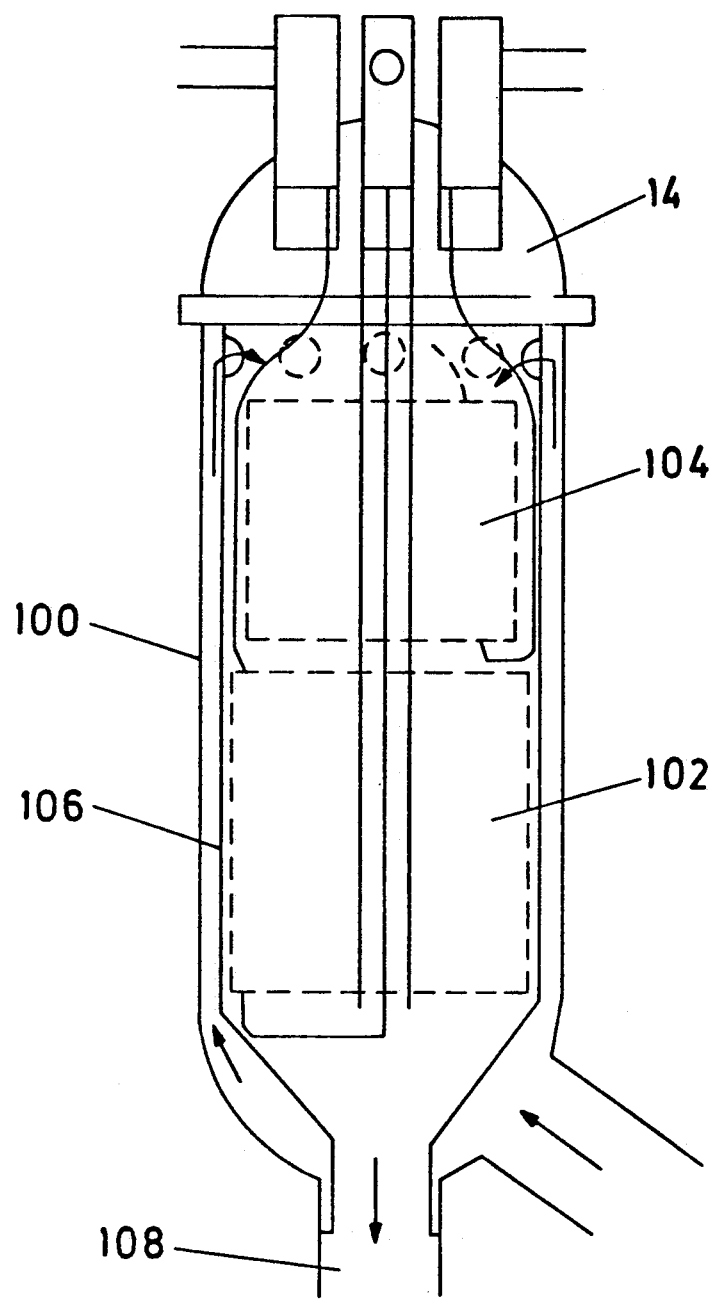
FIG. 3A is a vertical section through a helical coil steam generator that may be substituted for the steam generator 14 of FIG. 3.

The reactor core is located in a pressure vessel 6 (FIG. 3) that is surrounded by a primary shield wall 8, which forms a floodable cavity for the vessel and coolant outlet pipes 12.

The reactor core 2 is surrounded by a shield 3 which reduces the neutron flux at the pressure vessel wall such that the activation of the vessel material is reduced to a low value. The provision of such a shield 3 is practicable because the low operating pressure of the reactor enables the wall thickness of the pressure vessel 6 to be substantially less than in the PWR. The vessel diameter can therefore be increased without difficulty to accommodate the shield 3.

The shield 3 may be made of several thicknesses of steel plate cooled by the inlet flow of coolant. Preferably it is of modular construction to permit easy decommissioning.

The reactor core 2 comprises an approximately cylindrical array of fuel assemblies, each assembly comprising a square array of fuel pins, held together by end fittings and with support grids located at intervals along their length. An appropriate number of fuel pin positions is occupied by guide tubes which accept control rods 60 of absorber material. The rods are withdrawn or inserted into the core as necessary to control the reactor.

The fuel pins comprise sealed tubes containing pellets of uranium oxide or carbide fuel material. The uranium of the fuel is enriched to a low level sufficient to achieve high burn-up of the fuel before discharge. At ratings appropriate for the power plant, the maximum fuel temperatures can be chosen such that fission product gas release from the fuel is virtually zero for carbide fuel.

The size and spacing, or pitch, of the fuel pins determines the core reactor physics properties. Compared with water moderated reactors, a larger pitch is required to give low enrichment and an adequately negative moderator density coefficient for self regulatory power characteristics and sufficient in magnitude to shut the reactor down under conditions in which the coolant boils or is lost. Absorbers may be added to or removed from the coolant to control the reactivity level ("chemical shim") but are not essential. "burnable poison" absorbers in separate pins or associated with the fuel rods may also be used as in other thermal reactors.

The organic coolant flow rate through the core should be chosen to achieve the desired velocity over the fuel pins and to maintain correct heat transfer conditions. In practice about twice the core mass flow of a PWR will be provided, at rather higher flow velocity. To permit the high flow rate into and out of the core, large diameter coolant pipe work will be provided to maintain acceptable pressure head losses. Inlets 10 (of which only one is shown in FIG. 3) are located above the outlets 12 (of which only one is shown in FIG. 3) and above the core so that the core remains flooded with coolant and cooled by the emergency systems under any credible loss of coolant fault conditions.

The pumps, motors and motor fly wheels used for the PWR may be adopted with no special requirements. Seal design is simplified by the low coolant pressure and the lubricating properties of the coolant.

Figure 2:
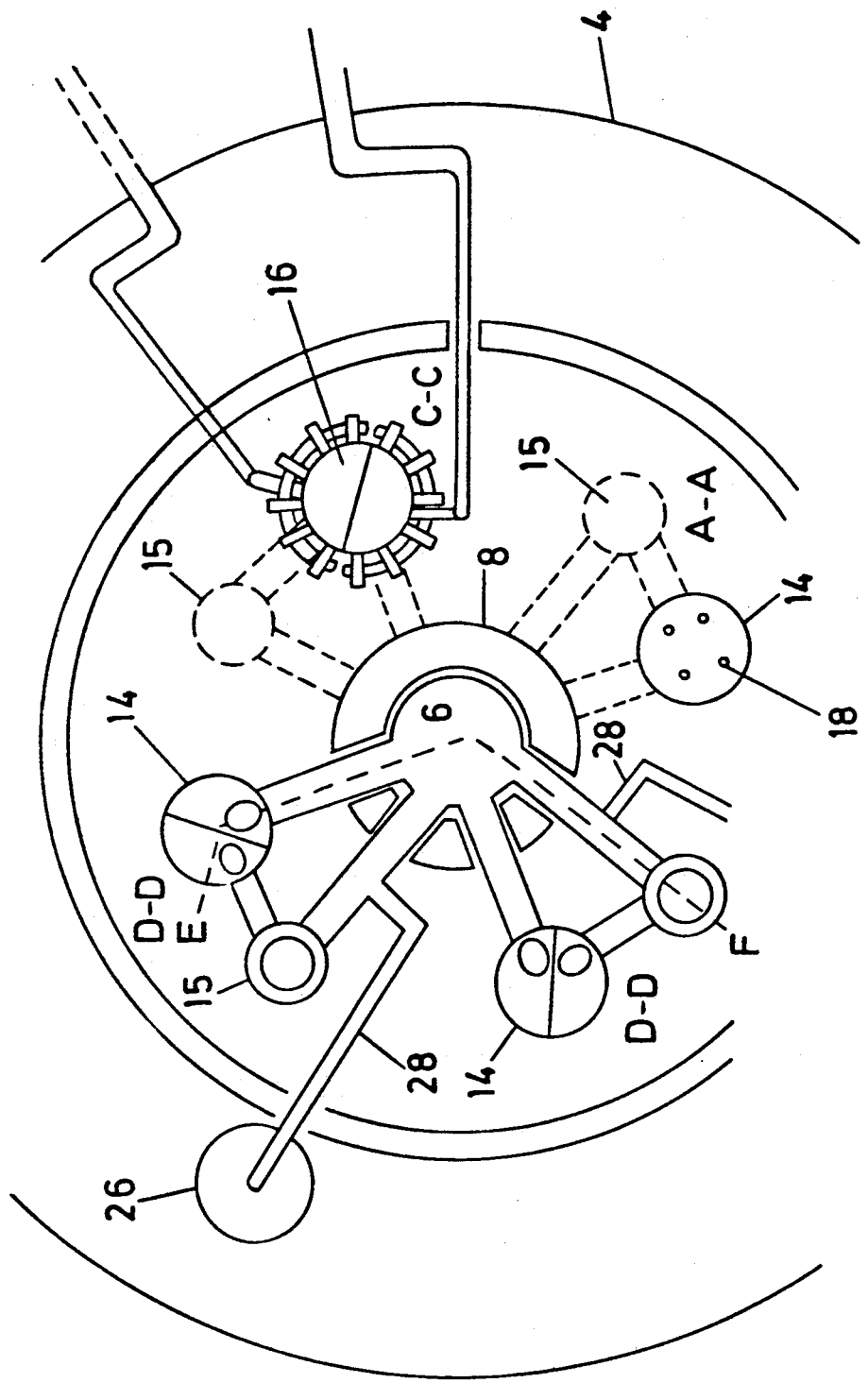
FIG. 2 is a schematic plan view of the interior of the containment building of FIG. 1, showing four different circulation loops for primary coolant, each shown in plan or in section at the respective levels A—A, C—C, and D—D, of FIG. 3.

Within the containment building 4 there are provided four separate steam generators 14 shown in different sections in FIG. 2. Each comprises a shell and tube unit with the primary organic coolant on the shell side so that the pressure envelope need only be designed for low pressure. This pressure should be an adequate control pressure over the basic saturation pressure of the coolant at the temperature under consideration. For example, the pressure could be about 400 p.s.i.g., (2,758,800 pascals) which is about 300 p.s.i., (2,069,100 pascals) over the saturation vapour pressure of a hydrogenated mixture of terphenyls at an operating temperature of 400° C.

The over-pressure necessary to maintain the organic coolant in its liquid phase is provided by a nitrogen volume 16 at the top of each steam generator. This is sufficient to maintain the organic coolant sub-cooled at all times. Connected to this gas space 16 are primary circuit safety relief valves 18. In addition to preventing primary circuit over-pressure in relevant transients, the relief valves 18 are also sized to relieve steam leaks into the primary circuit up to the complete rupture of several tubes. In the event of such a failure, the reactor and circulating pumps would be tripped, and the steam would rise to be relieved preferentially, leaving the sub-cooled primary coolant substantially unaffected. Alternatively, a separate pressuriser vessel may be attached to the coolant circuit in a similar manner to pressurised water reactors.

The secondary side of each heat exchanger 14 (FIG. 1) comprises a recirculating evaporator section 14A with steam separation being accomplished in a separate steam drum 14B, to which feed water is supplied at 14E, located externally of the containment building. The steam generators 14 with the external steam drum provide a substantial secondary side coolant inventory equivalent to approximately 15 minutes post reactor trip decay heat rejection following loss of all feed, giving an adequate margin for the action of all auxiliary safeguard systems.

Following the steam separation step, the dried but still saturated steam is then passed back at 14C to the steam generator 14 where it is super-heated and fed at 14D to a turbine generator (not shown). This steam cycle maintains the steam pressure relatively low, by virtue of the separation of the initial heating of the water and the super-heating of the steam, while still providing high quality steam in an efficient steam cycle.

The steam generators illustrated in FIGS. 2 and 3 are vertical shell and tube heat exchangers with individual access to each tube via tube sheets which are vertical and crevice-free. This arrangement permits thorough and easy inspection of the tubes and offers very good reliability and ease of maintenance.

Alternatively, because the materials of the steam generator tubing, which may be low alloy steels, for example, can be chosen from those known to give highly reliable service under established water/steam side conditions, more compact steam generators may be used. Multi-start helical coil tube steam generators can now be manufactured in a manner such that in-situ in service inspection of the tubes is practicable. Such a steam generator is shown schematically in FIG. 3A as 14', and comprises a shell 100 housing two helical tube bundles 102 and 104. Organic primary coolant is fed to the shell 100 and rises over a baffle 106 and down through the helixes of the tube bundles 102 and 104. Water is passed through the lower helical tube 102 for evaporation, and after separation, steam is then passed through the upper helical tube bundle 104 to be super-heated.

The coolant circulating pumps may conveniently be mounted axially at the outlet 108 of the steam generators of this design if desired.

If the safety margins of the reactor are judged to be adequate without the secondary coolant inventory inherent in the recirculating boilers described above, a once-through boiler incorporating a super-heater may be used, dispensing with the external steam drum. A small start-up steam receiver located externally of the containment building may then be utilised if desired.

The entire primary coolant pressure boundary, comprising the reactor pressure vessel 6 and the pipework, pump casing 15 and steam generators 14 may be made of carbon steel with no cladding of the internal surfaces. The component sizes and pressure duty are such that only modest sections are required, for example approximately 2 inches (4.8 cm) for the pressure vessel barrel section. The design may therefore be based on "leak before break" integrity arguments for the entire pressure circuit, which preclude catastrophic failure of the pressure circuit as a safety concern. Corrosion of the steel by the organic coolant is extremely low, and the temperature of operation is below the level at which deformation of the structures by creep is significant. Because only small quantities of active corrosion products are deposited in the circuit, all parts except those subject to direct radiation from the fuel or activated parts are accessible off load for inspection and maintenance without significant personnel radiation problems, need for shielding, or complex remotely controlled or automatic equipment.

Within the pressure vessel 6 the core is surrounded by the shield 3 which prevents the pressure vessel from being irradiated by neutrons. This both prevents any possibility of irradiation embrittlement of the steel and facilitates easier access for pressure vessel inspection. Such access is possible from the interior of the vessel when the reactor internal structures have been removed, or from the outside. The provision of the internal shield 3 means that only those items immediately associated with the core are significantly activated by the neturon flux. This makes in-service repair of the reactor more practicable e.g. replacement of the pressure vessel should it be necessary.

Decommissioning of the station is also eased because all highly active parts can be removed without the use of demolition techniques. The highly active components are made of components having small dimensions & mass and are readily packaged for disposal. Only light decontamination (if any) is required of the remaining circuit items which may then be removed by normal demolition techniques. These properties will not only minimise decommissioning costs but will allow the site to be cleared much more quickly than for any current reactor.

Fluid safeguard systems which maintain adequate core cooling under fault and loss of coolant conditions comprise four principal systems as described below, of which 2 and 3 act to maintain the reactor core flooded and cooled in a post-accident condition without the need for any prime mover or power source.

1. On the secondary coolant side, emergency feed systems 14F which maintain the water supply to the steam generators when the main recirculating feed supply is lost. This will cool the core 2 via natural circulation in the primary and secondary circuits for all intact primary circuit faults. Steam may be dumped to a condenser (not shown) or to the atmosphere via power operated relief valves or spring-actuated safety valves.

2. A decay heat rejection loop which maintains cooling of the core when cooling via the secondary circuit is lost. This would occur, for example, with intact primary circuit faults or for post transient breached primary circuit conditions. A heat exchange coil 20, illustrated in FIGS. 1 and 3, is located within the pressure vessel 6 below the coolant inlet 10. The heat exchange coil 20 is filled with the same organic coolant as that used in the primary circuit, or with another compatible organic coolant and is connected in a circuit with an air-cooled heat exchanger 22 located at high elevation externally of the containment building. There is thus provided a primary organic coolant-to-intermediate organic coolant-to-atmospheric heat rejection system which in a post-accident situation operates purely passively utilizing natural convection. The valve 21 illustrated in the primary vessel 6 is a flap valve which is normally held closed against the bias of spring means (not shown) by the operating pressure of the main coolant pump 15 but which opens automatically when that pressure head is removed. The first stage of heat rejection is thereby established as a natural convection circuit within the primary vessel 6. A valve 24 is designed as a power-closed valve which opens automatically on reactor trip to establish the second stage of heat rejection, also as a natural convection circuit. If desired, however, the valve 24 may be omitted and the second natural convection circuit may be permanently open-circuit for increased safety at the expense of some heat loss to atmosphere during normal operation.

The geometry of the primary vessel 6 in FIG. 3 illustrates a design in which the conduit 12 is deemed incredible of failure, so that the valve 21 and heat exchange coil 20 are above the level of the pipe 21. If the design were to acknowledge the possibility of failure of the conduit 12, then the valve 21 and coil 20 would be placed at a level below that of the conduit 12.

3. Four organic coolant accumulators 26 (1 only shown in FIGS. 1, 2 and 3) which are pressurised by nitrogen to a pressure lower than the normal circuit operating pressure but higher than the coolant saturation pressure at the operating temperature. Each accumulator has a coolant inventory similar to that of the primary cooling circuit and contains coolant which is either fresh, unirradiated organic coolant as used for make-up of the reactor coolant inventory or a higher boiling point organic coolant for emergency coolant duties. Two of the accumulators 26 are connected to the reactor inlet loops by large diameter pipes 28 and two by small diameter pipes and each is isolated by a single nonreturn valve 30. The inventory and delivery rate of the accumulators 26 are such that for even fairly large breaches in the primary coolant circuit, the coolant remains sub-cooled throughout the transient. For very large breaches flashing conditions occur only transiently before a sub-cooled organic coolant inventory is injected. The two accumulators connected by smaller pipes would continue to supply coolant to the reactor for at least 10 minutes to provide core cooling in the immediate post-accident condition.

At this stage the natural convection, primary organic coolant-to-intermediate organic coolant-to-atmosphere heat rejection loop discussed above would begin to operate by action of the spring loaded nonreturn valve 24, but additionally forced flow could be established by the recirculatory system described below.

4. Emergency coolant circulating pumps 32 (FIG. 1) would take coolant that had leaked into a sump 34 of the containment building 4, cool it in a heat exchanger 36 and recirculate it past a nonreturn valve 38 to the core 2 to maintain long term cooling following major accidents.

Other operational and maintenance aspects of the power plant would utilise known technology. For example, auxiliary circuits would maintain the organic coolant purity by a continuous bypass clean up process. The coolant may be purified by any one of a number of alternative methods, the simplest being the filtration through atapulgas clay to remove any high molecular weight degradation products. The coolant could also be de-gassed at low pressure. It would be desirable to control oxygen and chlorine impurity levels within close limits, but the coolant has a relatively high moisture content and is tolerant of small steam leaks into the system.

The refuelling method is in principle similar to that for PWR. Refuelling would be carried out off load with the pressure vessel head and upper reactor internal structures removed. The fuel would be removed from the core by a grab working within an organic coolant-filled flask which then transfers the fuel to a transfer bay where the fuel is transferred under organic coolant to the irradiated fuel storage pond. Fuel would be stored in the pond for as long as is required in sealed stainless steel cans filled with organic coolant stored under water in the usual manner.

Because the organic coolant is opaque, handling techniques for handling the fuel would have to differ in certain respects from the methods used in PWR. However the ultrasonic viewing techniques developed for liquid metal cooled reactors could be utilised to ensure safe fuel handling.

The fuel cycle would typically be a three year one, with a third of the core being replaced by fresh fuel each year. The remaining fuel assemblies would be moved to new positions as necessary to make most efficient use of their reactivity levels, in a manner similar to PWR.

Figure 4:
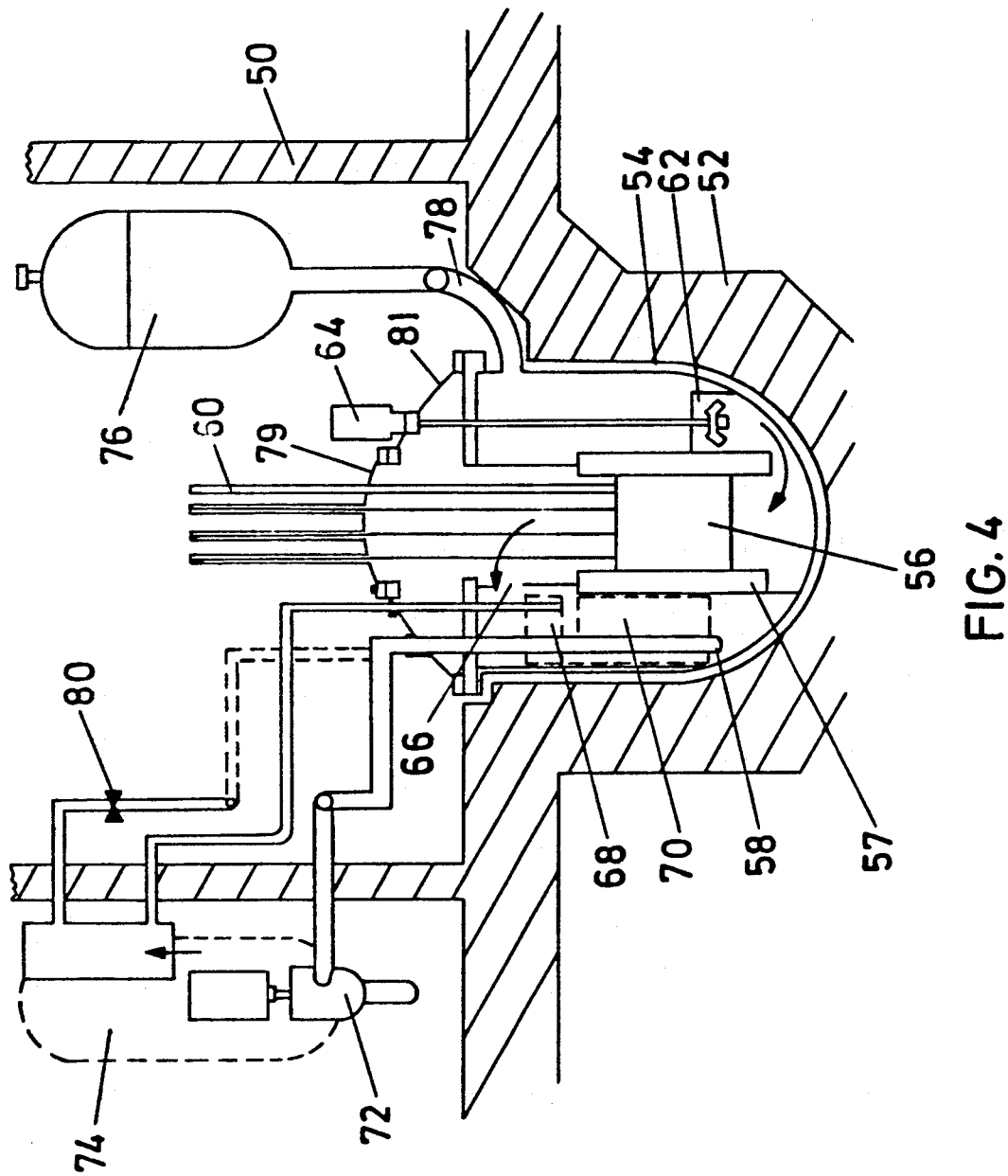
FIG. 4 is a vertical section through an alternative power plant according to the invention.
Figure 5:
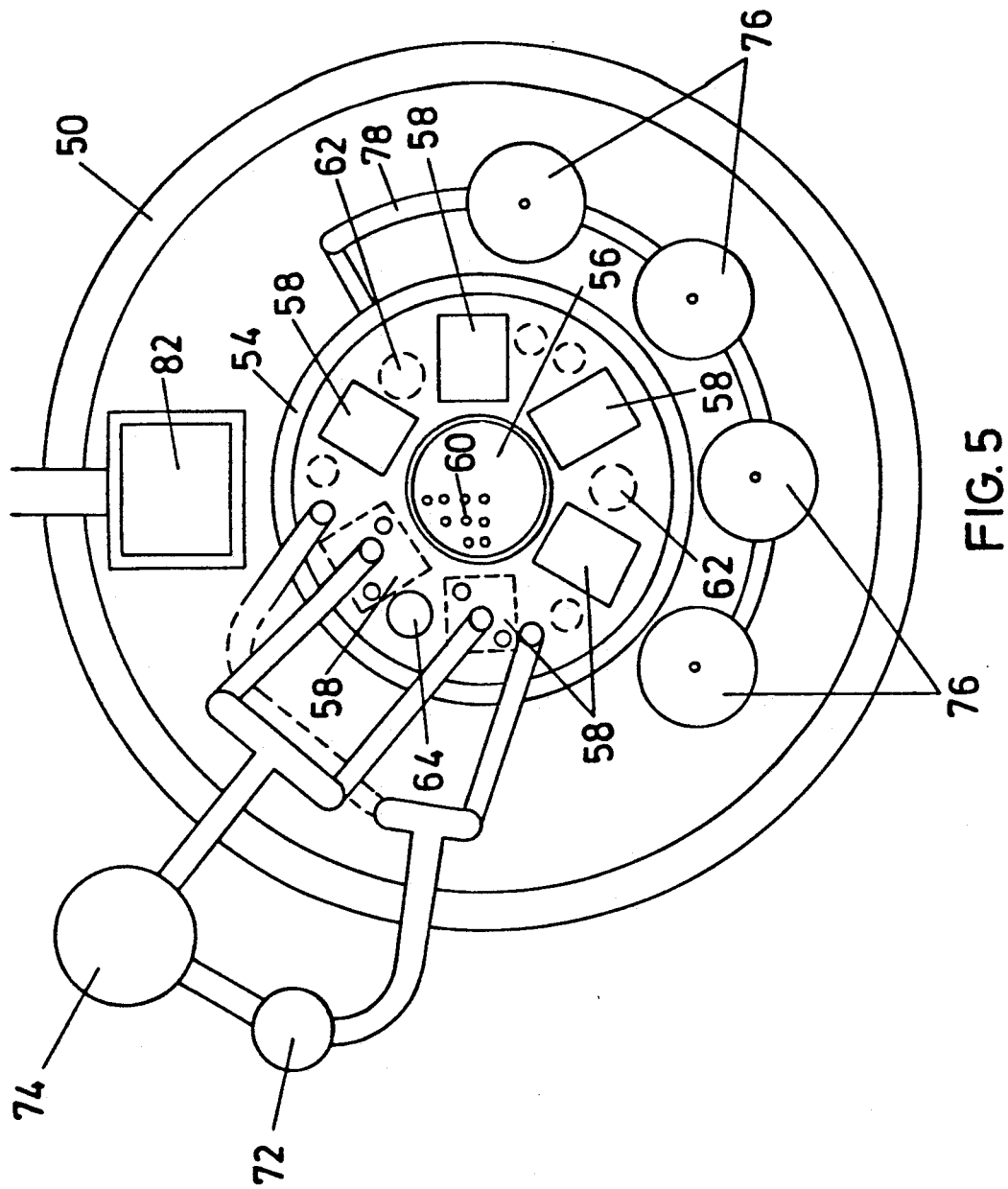
FIG. 5 is a schematic plan view of the interior of the containment building of FIG. 4, together with one of three additional heat exchangers that would be provided to obtain an output of hot water or steam from the reactor.

Referring next to the embodiment of FIGS. 4 and 5, there is shown a rather smaller power plant with a suggested utility for urban heat requirements or combined heat and power requirements in urban locations where further margins of safety are considered desirable. This embodiment takes fuller advantage of the properties of the organic coolant, to permit the operation of the primary circuit at substantially atmospheric pressure. Thus there is no risk of two-phase conditions arising should the primary circuit be breached.

The power plant illustrated in FIGS. 4 and 5 comprises a containment building 50 with an integral shield wall 52 in which is located a core vessel 54. Within the vessel 54 are a core 56 surrounded by a neutron shield 57 and by six heat exchangers 58 as most clearly illustrated in FIG. 5. The core 56 comprises a cylindrical array of fuel assemblies, each comprising an array of fuel pins held together by end fittings and with support grids located at intervals along their length. As with the first embodiment described, some of the fuel pin positions may accept control rods 60 of absorber material.

Three primary pumps 62 are provided, each powered by its own pump motor 64 and each acting to draw the organic coolant downwardly through the shells of two adjacent heat exchangers 58. The pumped organic coolant then passes upwardly through the core 56 to the inlets 66 of the heat exchangers.

Each heat exchanger 58 comprises an upper tube bank 68 which contains organic coolant in a decay heat rejection loop as described below, and a lower tube bank 70 which contains the secondary coolant. The secondary coolant in the coil 70 is the same organic coolant as that used in the primary circuit or one compatible with it, and is circulated from each pair of adjacent heat exchangers 58 by a secondary pump 72 through a heat exchanger such as a steam generator 74 prior to its return to the heat exchanger 70. The secondary pump 72 and steam generator 74 are located externally of the containment building 50, and the primary organic coolant-to-secondary organic coolant-to-water heat transfer cycle is such that the water is fully-protected from all radio-active contamination. Any steam or high pressure water leakage to the intermediate circuit is vented through relief valves (not shown) located externally of the containment building.

To protect against breach of the primary circuit, there are provided pressuriser vessels 76 connected to the core vessel 54 by large diameter pipe-work 78. The capacity of the pressurisers 76 enables that on breach of the primary circuit the vessel cavity would become completely flooded. There is thus no possibility of the primary circuit containing significant voids at any stage provided that major structural failure of the core vessel 54 is not considered credible. This position can be justified by the extremely modest duty of the core vessel 54. However even if structural failure should occur, it is unlikely that the core would be uncovered, even temporarily. The containment building 50 is operated at slightly above atmospheric pressure, so that before the pressurisers 76 are empty, the containment pressure and pressuriser pressure are equal. Thereafter only gravitational forces operate, making the emergency coolant injection system entirely automatic.

The decay heat rejection loop referred to above, incorporating the tube bank 68, is a primary organic coolant-to-secondary organic coolant-to-atmosphere loop which is capable of rejecting post trip decay heat directly to the atmosphere, and cooling the core by natural circulation, on opening of a power operated valve 80.

The refuelling and auxiliary functions such as the maintenance of the organic coolant purity in this embodiment are similar to those described in respect of the embodiment of FIGS. 1 to 3. FIG. 5 shows schematically a fuel handling pit 82 within the containing building 50. Only the centre part of the pressure vessel head 79 needs to be removed for refuelling purposes. The complete vessel head 81 need only be removed for major maintenance and inspection requirements.

I claim:

1. In a power plant including a containment building which houses a nuclear reactor core containing an enriched uranium fuel in a primary cooling vessel means that partially contains a closed primary cooling circuit for cooling said core, and means for generating in said primary cooling circuit a single pass flow, upwardly through said core, of an organic liquid as primary coolant and moderator with said organic liquid being supplied to the primary cooling circuit initially as feed coolant having a first chemical composition and physical characteristics, and means for maintaining in the primary cooling circuit an operating primary coolant and moderator having a second chemical composition and physical characteristics, an improved passively operating emergency cooling system that is operable to respond automatically to a postulated fault condition comprising a breach of said primary cooling circuit, said emergency cooling system comprising:

means for flooding said core with emergency coolant on a breach of said primary cooling circuit and heat rejection means for cooling said emergency coolant, said flooding means including an accumulator means having a liquid capacity several times greater than the inventory of said primary cooling circuit, organic emergency coolant maintained in said accumulator means at a pressure head above the saturated vapour pressure, at normal operating temperature, of the primary organic coolant and moderator, said organic emergency coolant in said accumulator means being mutually compatible with the said operating primary organic coolant and moderator but having a different chemical composition and physical characteristics including a higher boiling point at atmospheric pressure from either the feed coolant or the operating primary organic coolant and moderator, and pressure responsive means for delivery of said organic emergency coolant from said accumulator means to said core under said pressure head in said accumulator means in response to such a postulated fault condition which include loss of pressure in said primary cooling circuit;

and said heat rejection means being operable to cool said organic emergency coolant in said core on such a breach of the primary cooling circuit in a manner to maintain cooling of said core without boiling of said organic emergency coolant, and comprising means for establishing, on occurrence of such a postulated fault condition, a first natural convection circuit within said primary cooling vessel means, to maintain a natural convention flow of the said organic emergency coolant through said core sustained by heat rejection to a first heat exchanger and a second natural convection circuit, for establishing a natural convention flow of an intermediate organic coolant through said first heat exchanger sustained by heat rejection to a second heat exchanger, said second heat exchanger being a high-level heat exchanger cooled by atmospheric air externally of the containment building.

2. A power plant according to claim 1, wherein the means for establishing the natural convection flow of the said organic emergency coolant through said core comprises pressure-closed valve means in said primary cooling vessel for preventing convection flow of organic liquid therein when a pressure head of pumped organic liquid is maintained thereacross.

3. A power plant according to claim 1, wherein said accumulator means comprises a plurality of accumulators and means establishing different coolant discharge rates from the different ones of said accumulators.

4. A power plant according to claim 1, wherein said intermediate organic coolant in said second natural convention circuit and the said organic emergency coolant are the same organic coolant.

5. A power plant according to claim 1, wherein said closed primary cooling circuit includes means defining a primary cooling circuit pressure boundary capable of withstanding an operating pressure of up to 550 p.s.i.g.

6. A power plant according to claim 5, wherein said primary cooling circuit is in heat exchange relationship with secondary coolant in a secondary cooling circuit which includes a shell and tube heat exchanger defining a flow path for said primary organic coolant and moderator through the shell portion thereof and a flow path for said secondary coolant through the tube portion thereof.

7. A power plant according to claim 6, wherein said shell and tube heat exchanger is a steam generator and said secondary coolant is water.

8. A power plant according to claim 6, wherein said primary organic coolant and moderator has at its operating temperature a saturated vapour pressure below atmospheric pressure, and said secondary cooling circuit includes means defining a secondary coolant pressure boundary designed to withstand an operating pressure of up to 50 p.s.i.g.

9. A power plant according to claim 7, wherein said shell and tube heat exchanger is an organic primary coolant-to-organic secondary coolant heat exchanger containing the same or mutually compatible primary and secondary coolants, and said secondary cooling circuit further comprises means for transferring its heat to a steam generator or water heater externally of said reactor containment building.

10. A power plant according to claim 1, further comprising a shield of neutron-absorbing material between the fuel of the core and a wall of said primary cooling vessel.

11. A power plant according to claim 10, the shield being of modular construction for ease of decommissioning.

* * * * *